US005699382A

United States Patent [19]

Shoham et al.

[11] Patent Number: 5,699,382

[45] Date of Patent: Dec. 16, 1997

[54] METHOD FOR NOISE WEIGHTING FILTERING

[75] Inventors: Yair Shoham, Watchung, N.J.; Casimir Wierzynski, New York, N.Y.

[73] Assignee: Lucent Technologies Inc., Murray Hill, N.J.

[21] Appl. No.: 747,953

[22] Filed: Nov. 12, 1996

Related U.S. Application Data

[62] Division of Ser. No. 367,526, Dec. 30, 1994.

[51] Int. Cl.[6] .............................. H04B 14/04; G10L 9/00

[52] U.S. Cl. ........................... 375/243; 375/350; 381/47; 395/2.36

[58] Field of Search .................................... 375/243, 254, 375/285, 350; 381/47; 395/2.35, 2.36

[56] References Cited

U.S. PATENT DOCUMENTS

| | | | |
|---|---|---|---|
| 4,048,443 | 9/1977 | Crochiere et al. | 381/47 |
| 4,802,171 | 1/1989 | Rasky | 371/43 |
| 4,831,624 | 5/1989 | McLaughlin et al. | 371/37.1 |
| 4,958,871 | 9/1990 | Swaminathan | 395/2.38 |
| 4,972,484 | 11/1990 | Theile et al. | 395/2.36 |
| 5,040,217 | 8/1991 | Brandenburg et al. | 381/47 |
| 5,151,941 | 9/1992 | Nishigushi et al. | 381/47 |
| 5,228,088 | 7/1993 | Kane et al. | 381/47 |
| 5,341,457 | 8/1994 | Hall, II et al. | 395/2.36 |
| 5,365,553 | 11/1994 | Veldhuis et al. | 375/241 |
| 5,367,608 | 11/1994 | Veldhuis et al. | 395/2.38 |

FOREIGN PATENT DOCUMENTS

| | | | |
|---|---|---|---|
| A-0240329 | 1/1987 | European Pat. Off. | G10L 5/06 |
| A-0240330 | 1/1987 | European Pat. Off. | G10L 5/06 |
| A-0575815 | 8/1993 | European Pat. Off. | G10L 5/06 |

OTHER PUBLICATIONS

N. Jayant et al., "Signal Compression Based on Models of Human Perception," *Proceedings of the IEEE*, vol. 18, No. 10, 1385–1422 (Oct. 1993).

J. P. Egan et al., "On the Masking Pattern of a Simple Auditory Stimulus," *Journal of the Acoustical Society of America*, vol. 22, NO. 5, 622–630 (Sep. 1950).

M. R. Schroeder et al., "Optimizing digital speech coders by exploiting masking properties of the human ear," *Journal of the Acoustical Society of America*, vol. 66, No. 6, 1647–1652 (Dec. 1979).

B. Scharf, "Complex Sounds and Critical Bands," *Psychological Bulletin*, vol. 58, No. 3, 205–217 (1961).

J.-H. Chen, "A Robust Low-Delay CELP Speech Coder at 16 Kbit/s," *Proceedings GLOBECOM*, vol. 2, 1237–1240 (1989).

B. S. Atal et al., "Predictive Coding of Speech Signals and Subjective Error Criteria," *IEEE Transactions on Acoustics, Speech and Signal Processing*, vol. ASSP–27, No. 3, 247–254 (Jun. 1979).

E. Zwicker et al., "Citical Band Width in Loudness Summation," *The Journal of The Acoustical Society of America*, 548–557 (May 1957).

R. L. Wegel et al., "The Auditory Masking of One Pure Tone by Another and its Probable Relation to the Dynamics of the Inner Ear," *Physical Review*, vol. 23, No. 2, 266–285 (1924).

E. Ordentlich et al., "Low-Delay code-Excited Linear-Predictive Coding of Wideband Speech at 32 Kbps," *Proceedings ICASSP*, 622–630 (1991).

J. D. Johnston, "Transform Coding of Audio Signals Using Perceptual Noise Criteria," *IEEE Journal on Selected Areas in Communications*, vol. 6. No. 2, 314–323 (Feb. 1988).

*Primary Examiner*—Stephen Chin
*Assistant Examiner*—Jeffrey W. Gluck
*Attorney, Agent, or Firm*—Katharyn E. Olson; Kenneth M. Brown

[57] ABSTRACT

The invention is used to shape noise in time domain and frequency domain coding schemes. The method advantageously uses a noise weighting filter based on a filterbank with variable gains. A method is presented for decoding an encoded signal based on received side information and on a masking matrix derived from the masking properties of speech. In particular, the encoded signal is separated into subband signal components, each of which is multiplied by a corresponding gain value based on the masking matrix. These multiplied subband signal components are then combined to produce a decoded signal.

12 Claims, 3 Drawing Sheets

METHOD FOR NOISE WEIGHTING FILTERING

This is a division of application Ser. No. 08/367,526 filed Dec. 30, 1994.

TECHNICAL FIELD

This invention relates to noise weighting filtering in a communication system.

BACKGROUND OF THE INVENTION

Advances in digital networks like ISDN (Integrated Services Digital Network) have rekindled interest in teleconferencing and in the transmission of high quality image and sound. In an age of compact discs and high-definition television, the trend toward higher and higher fidelity has come to include the telephone as well.

Aside from pure listening pleasure, there is a need for better sounding telephones, especially in the business world. Traditional telephony, with its limited bandwidth of 300–3400 Hz for transmission of narrowband speech, tends to strain the listeners over the length of a telephone conversation. Wideband speech in the 50–7000 Hz range, on the other hand, offers the listener more presence (by reason of transmission and reception of signals in the 50–300 Hz range) and more intelligibility (by reason of transmission and reception of signals in the 3000–7000 Hz range) and is easily tolerated over long periods. Thus, wideband speech is a natural choice for improving the quality of telephone service.

In order to transmit speech (either wideband or narrowband) over the telephone network, an input speech signal, which can be characterized as a continuous function of a continuous time variable, must be converted to a digital signal—a signal that is discrete in both time and amplitude. The conversion is a two step process. First, the input speech signal is sampled periodically in time (i.e., at a particular rate) to produce a sequence of samples where the samples take on a continuum of values. Then the values are quantized to a finite set of values, represented by binary digits (bits), to yield the digital signal. The digital signal is characterized by a bit rate, i.e., a specified number of bits per second that reflects how often the input signal was sampled and many bits were used to quantize the sampled values.

The improved quality of telephone service made possible through transmission of wideband speech, unfortunately, typically requires higher bit rate transmission unless the wideband signal is properly coded, i.e., such that the wideband signal can be significantly compressed into representation by fewer number of bits without introducing obvious distortion due to quantization errors. Recently some coders of high-fidelity speech and audio have relied on the notion that mean-squared-error measures of distortion (e.g., measures of the energy difference between a signal and the signal after coding and decoding) do not necessarily describe the perceived quality of the coded waveform—in short, not all kinds of distortion are equally perceptible. M. R. Schroeder, B. S. Atal and J. L. Hall, "Optimizing Digital Speech Coders by Exploiting Masking Properties of the Human Ear," *J. Acous. Soc. Am.*, vol. 66, 1647–1652, 1979. For example, the signal-to-noise ratio between s(t) and −s(t)is −6 dB, and yet the ear cannot distinguish the two signals. Thus, given some knowledge of how the auditory system tolerates different kinds of noise, it has been possible to design coders that minimize the audibility—though not necessarily the energy—of quantization errors. More specifically, these recent coders exploit a phenomenon of the human auditory system known as masking.

Auditory masking is a term describing the phenomenon of human hearing whereby one sound obscures or drowns out another. A common example is where the sound of a car engine is drowned out if the volume of the car radio is high enough. Similarly, if one is in the shower and misses a telephone call, it is because the sound of the shower masked the sound of the telephone ring; if the shower had not been running, the ring would have been heard. In the case of a coder, noise introduced by the coder ("coder" or "quantization" noise) is masked by the original signal, and thus perceptually lossless (or transparent) compression results when the quantization noise is shaped by the coder so as to be completely masked by the original signal at all times. Typically, this requires that the coding noise have approximately the same spectral shape as the signal since the amount of masking in a given frequency band depends roughly on the amount of signal energy in that band. P. Kroon and B. S. Atal, "Predictive Coding of Speech Using Analysis-by-Synthesis Techniques," in *Advances in Speech Signal Processing* (S. Furui and M. M. Sondhi, eds.) Marcel Dekker, Inc., New York, 1992.

Until now there have been two distinct approaches to perceptually lossless compression, corresponding respectively to two commercially significant audio sources and their different characteristics—compact disc/high-fidelity music and wideband (50–7000 Hz) speech. High-fidelity music, because of its greater spectral complexity, has lent itself well to a first approach using transform coding strategies. J. D. Johnston, "Transform Coding of Audio Signals Using Perceptual Criteria," *IEEE J. Sel. Areas in Comm.*, 314–323, June 1988; B. S. Atal and M. R. Schroeder, "Predictive Coding of Speech Signals and Subjective Error Criteria," *IEEE Trans. ASSP*, 247–254, June 1979. In the speech processing arena, by contrast, a second approach using time-based masking schemes, e.g. code-excited linear predictive coding (CELP) and low-delay CELP (LD-CELP) has proved successful. E. Ordentlich and Y. Shoham, "Low Delay Code-Excited Linear Predictive Coding of Wideband Speech at 32 Kbps," *Proc. ICASSP*, 1991; J. H. Chen, "A Robust, Low-Delay CELP Speech Coder at 16 Kb/s," *GLOBECOM* 89, vol. 2, 1237–1240, 1989.

The two approaches rely on different techniques for shaping quantization noise to exploit masking effects. Transform coders use a technique in which for every frame of an audio signal, a coder attempts to compute a priori the perceptual threshold of noise. This threshold is typically characterized as a signal-to-noise ratio where, for a given signal power, the ratio is determined by the level of noise power added to the signal that meets the threshold. One commonly used perceptual threshold, measured as a power spectrum, is known as the just-noticeable difference (JND) since it represents the most noise that can be added to a given frame of audio without introducing noticeable distortion. The perceptual threshold calculation, described in detail in Johnston, supra, relies on noise masking models developed by Schroeder, supra, by way of psychoacoustic experiments. Thus, the quantization noise in JND-based systems is closely matched to known properties of the ear. Frequency domain or transform coders can use JND spectra as a measure of the minimum fidelity—and therefore the minimum number of bits—required to represent each spectral component so that the coded result cannot be distinguished from the original.

Time-based masking schemes involving linear predictive coding have used different techniques. The quantization noise introduced by linear predictive speech coders is approximately white, provided that the predictor is of sufficiently high order and includes a pitch loop. B. Scharf, "Complex Sounds and Critical Bands," *Psychol. Bull.*, vol. 58, 205–217, 1961; N. S. Jayant and P. Noll, *Digital Coding of Waveforms*, Prentice-Hall, Englewood Cliffs, N.J., 1984. Because speech spectra are usually not flat, however, this distortion can become quite audible in inter-formant regions or at high frequencies, where the noise power may be greater than the speech power. In the case of wideband speech, with its extreme spectral dynamic range (up to 100 dB), the mismatch between noise and signal leads to severe audible defects.

One solution to the problems of time-based masking schemes is to filter the signal through a noise weighting (or perpetual whitening) filter designed to match the spectrum of the JND. In current CELP systems, the noise weighting filter is derived mathematically from the system's linear predictive code (LPC) inverse filter in such a way as to concentrate coding distortions in the formant regions where the speech power is greater. This solution, although leading to improvements in actual systems, suffers from two important inadequacies. First, because the noise weighting filter depends directly on the LPC filter, it can only be as accurate as the LPC analysis itself. Second, the spectral shape of the noise weighting filter is only a crude approximation to the actual JND spectrum and is divorced from any particular relevant knowledge like psychoacoustic models or experiments.

SUMMARY OF THE INVENTION

In accordance with the invention, a masking matrix is advantageously used to control a quantization of an input signal. The masking matrix is of the type described in our co-pending application, Ser. No. 08/367,371, entitled "A Method for Measuring Speech Masking Properties," filed concurrently with this application, commonly assigned and hereby incorporated in part as an appendix to the present application. Specifically, the invention provides a method and apparatus for decoding an encoded signal based on received side information and on a masking matrix. In a preferred embodiment, the encoded signal is separated into subband signal components, each of which is multiplied by a corresponding gain value based on the masking matrix. These multiplied subband signal components are then combined to produce a decoded signal.

BRIEF DESCRIPTION OF THE DRAWINGS

Advantages of the invention will become apparent from the following detailed description taken together with the drawings in which.

DETAILED DESCRIPTION

Figure 1:
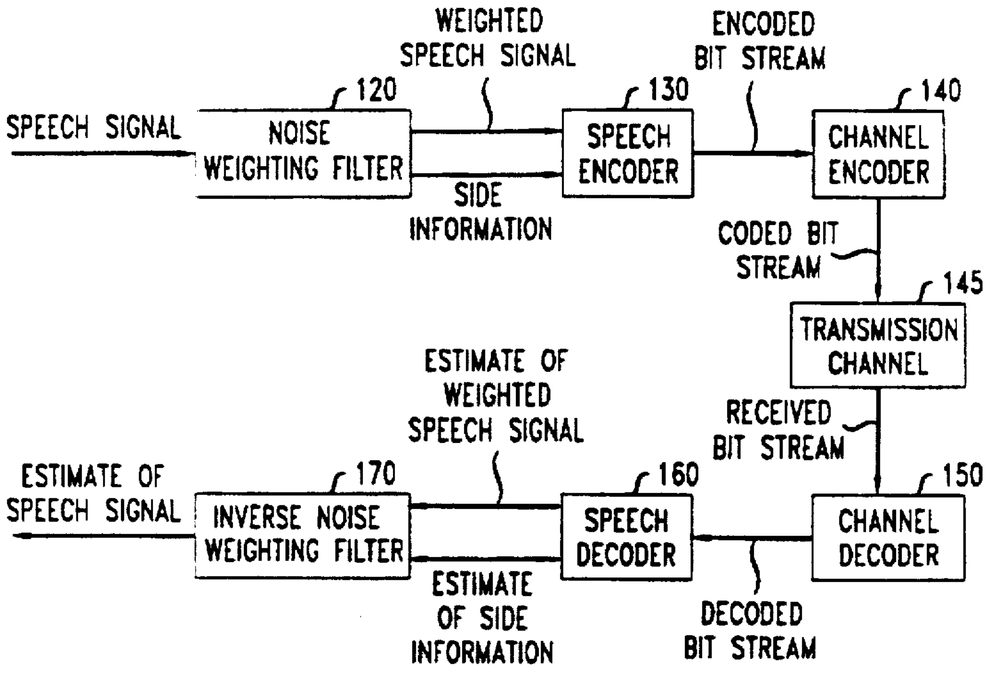
FIG. 1 is a block diagram of a communication system in which the inventive method may be practiced.

FIG. 1 is a block diagram of a system in which the inventive method for noise weighting filtering may be used. A speech signal is input into noise weighting filter 120 which filters the spectrum of the signal so that the perceptual masking of the quantization noise introduced by speech coder 130 is increased. The output of noise weighting filter 120 is input to speech encoder 130 as is any information that must be transmitted as side information (see below). Speech encoder 130 may be either a frequency domain or time domain coder. Speech encoder 130 produces a bit stream which is then input to channel encoder 140 which encodes the bit stream for transmission over channel 145. The received encoded bit stream is then input to channel decoder 150 to generate a decoded bit stream. The decoded bit stream is then input into speech decoder 160. Speech decoder 160 outputs estimates of the weighted speech signal and side information which are the input to inverse noise weighting filter 170 to produce an estimate of the speech signal.

The inventive method recognizes that knowledge about speech masking properties can be used to better encode an input signal. In particular, such knowledge can be used to filter the input signal so that quantization noise introduced by a speech coder is reduced. For example, the knowledge can be used in subband coders. In subband coders, an input signal is broken down into subband components, as for example, by a filterbank, and then each subband component is quantized in a subband quantizer, i.e., the continuum of values of the subband component are quantized to a finite set of values represented by a specified number of quantization bits. As shown below, knowledge of speech masking properties can be used to allocate the specified number of quantization bits among the subband quantizer, i.e., larger numbers of quantization bits (and thus a smaller amount of quantization noise) are allocated to quantizers associated with those subband components of an input speech signal where, without proper allocation, the quantization noise would be most noticeable.

In accordance with the present invention, a masking matrix is advantageously used to generate signals which control the quantization of an input signal. Control of the quantization of the input signal may be achieved by controlling parameters of a quantizer, as for example by controlling the number of quantization bits available or by allocating quantization bits among subband quantizers. Control of the quantization of the input signal may also be achieved by preprocessing the input signal to shape the input signal such that the quantized, preprocessed input signal has certain desired properties. For example, the subband components of the input signal may be multiplied by gain parameters so that the noise introduced during quantization is perceptually less noticeable. In either case, the level of quantization noise in the resulting quantized signal meets the perceptual threshold of noise that was used in the process of deriving the masking matrix. In the inventive method, the input signal is separated into a set of n subband signal components and the masking matrix is an n×n matrix where each element $q_{ij}$ represents the amount of (power) of noise in band j that may be added to signal component i so as to meet a masking threshold. Thus, the masking matrix Q incorporates knowledge of speech masking properties. The signals used to control the quantization of the input signals are a function of the masking matrix and the power in the subband signal components.

Figure 2:
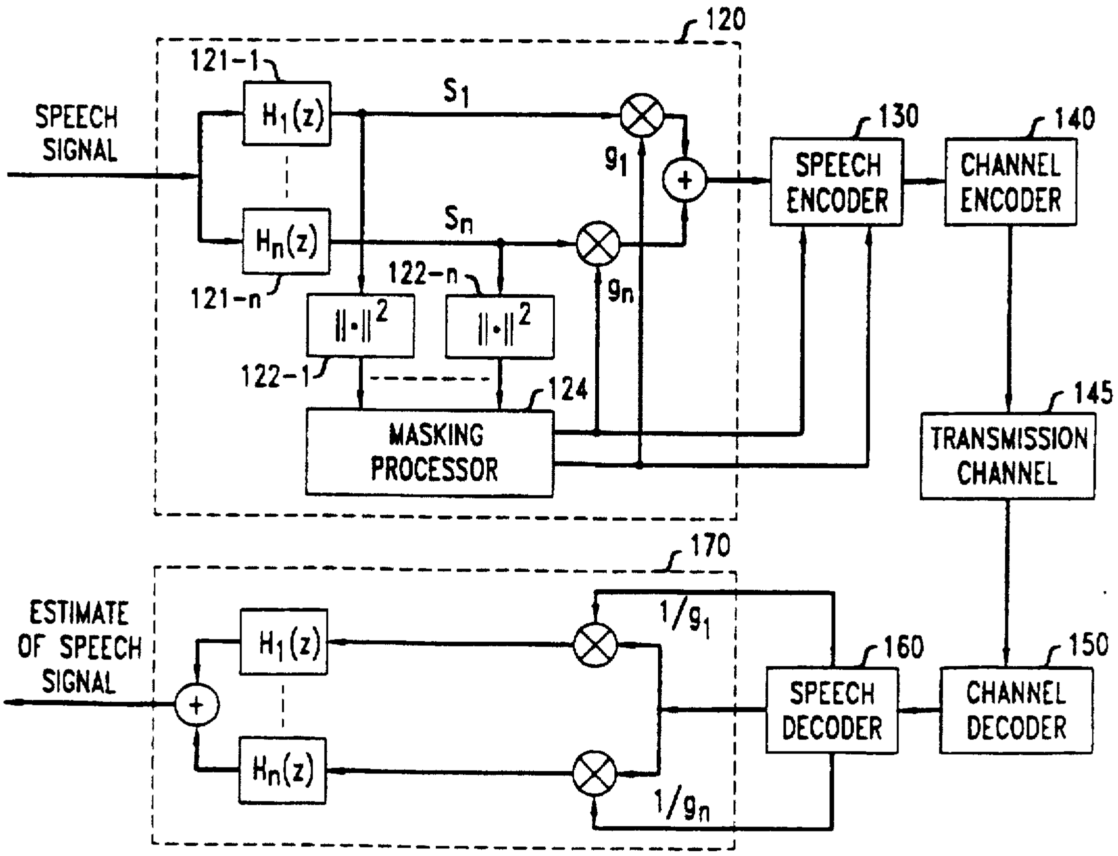
FIG. 2 is a block diagram of the inventive noise weighting filter in a communication system.

FIG. 2 illustrates a first embodiment of the inventive noise weighting filter 120 in the context of the system of FIG. 1. The quantization is open loop in that noise weighting filter 120 is not a part of the quantization process in speech coder 130. The speech signal is input to noise weighting filter 120 and applied to filterbank comprising n filters 121–i, i=1,2, .

. . . n. Each filter 121-i is characterized by a respective transfer function $H_i(z)$. The output of each filter 121-i is respective subband component $s_i$. The power $p_i$ in the respective output component signals is measured by power measures 122-i, and the measures are input to masking processor 124. The power of the input speech signal is denoted as $$P = \sum_{i=1}^{n} p_i.$$

Masking processor 124 determines how to adjust each subband component $s_i$ of the speech input using a respective gain signal $g_i$ so that the noise added by speech coder 130 is perceptually less noticeable when inverse filtered at the receiver. The power in the weighted speech signal is $$P_w = \sum_{i=1}^{n} p_i g_i^2.$$

The weighted speech signal is coded by speech coder 130, and the gain parameters are also coded by speech coder 130 as side information for use by inverse noise weighting filter 170.

The gain signals $g_i$, i=1,2, . . . n, are determined by masking processor 124. Note that the $g_i$'s have a degree of freedom of one scale factor in that all of the $g_i$'s may be multiplied by a fixed constant and the result will be the same, i.e., if $\gamma g_1, \gamma g_2 \ldots \gamma g_n$ were selected, then inverse filter 170 would simply multiply the respective subbands by $1/\gamma g_1, 1/\gamma g_2 \ldots 1/\gamma g_n$ to produce the estimate of the speech signal. So to simplify, it is conveniently assumed that the $g_i$'s are selected to be power preserving:

$$P_w = \sum_{i=1}^{n} p_i g_i 2 = P$$

At this point it is advantageous to define notation to describe the operation of masking processor 124. In particular, $V_p$ is defined to be the vector of input powers from power measures 122-i.

$$V_p = \begin{bmatrix} p_1 \\ p_2 \\ \cdot \\ \cdot \\ \cdot \\ p_n \end{bmatrix}$$

Masking processor 124 can also access elements $q_{i,j}$ of masking matrix Q. The elements may be stored in a memory device (e.g., a read only memory or a read and write memory) that is either incorporated in masking processor 124 or accessed by masking processor 124. Each $q_{i,j}$ represents the amount of noise in band j that may be added to signal component i so as to meet a masking threshold. A method describing how the Q masking matrix is obtained is disclosed in our above cited "A Method for Measuring Speech Masking Properties." It is convenient at this point to note that it is advantageous that the characteristics of filterbank 121 be identical to the characteristics of the filterbank used to determined the Q matrix (see the copending application, supra).

The vector $W_O$ is the "ideal" or desired noise level vector that approximates the masking threshold used in obtaining values for the Q matrix.

$$W_0 = \begin{bmatrix} W_{0_1} \\ W_{0_2} \\ \cdot \\ \cdot \\ \cdot \\ W_{0_n} \end{bmatrix} = QV_p \qquad (1)$$

The vector W represents the actual noise powers at the receiver, i.e., $$W = \begin{bmatrix} \beta P_w \frac{1}{g_1^2} \\ \beta P_w \frac{1}{g_2^2} \\ \cdot \\ \cdot \\ \cdot \\ \beta P_w \frac{1}{g_n^2} \end{bmatrix}$$

The vector W is a function of the weighted speech power, $P_w$, the gains and of a quantizer factor β. The quantizer factor is a function of the particular type of coder used and of the number of bits allocated for quantizing signals in each band.

The objective is to make W equal to $W_O$ up to a scale factor α, i.e., the shape of the two noise power vectors should be the same. Thus, $$W = \alpha W_0 = \alpha Q V_p$$

Substituting for the variables and solving for the gains yields:

$$\beta P \frac{1}{g_i^2} = \alpha W_{0_i}$$

$$g_i^2 = P \frac{\beta}{\alpha} \frac{1}{W_{0_i}}$$

$$\sum_{i=1}^{n} g_i^2 p_i = P \frac{\beta}{\alpha} \sum_{i=1}^{n} \frac{p_i}{W_{0_i}} = P$$

Observe that $$\frac{\beta}{\alpha} = \frac{1}{\sum_{i=1}^{n} \frac{p_i}{W_{0_i}}}$$

and substituting yields $$g_i^2 = \frac{\frac{P}{W_{0_i}}}{\sum_{j=1}^{n} \frac{p_j}{W_{0_j}}} \qquad (2)$$

Thus, in order to determine the gains $g_i$, the noise weighting filter must measure the subband powers $p_i$ and determine the total input power P. Then, the noise vector $W_O$ is computed using equation (1), and equation (2) is then used to determine the gains. The masking processor then generates gain signals for scaling the subband signals. The gains must be transmitted in some form as side information in this embodiment in order to de-equalize the coded speech during decoding.

Figure 3:
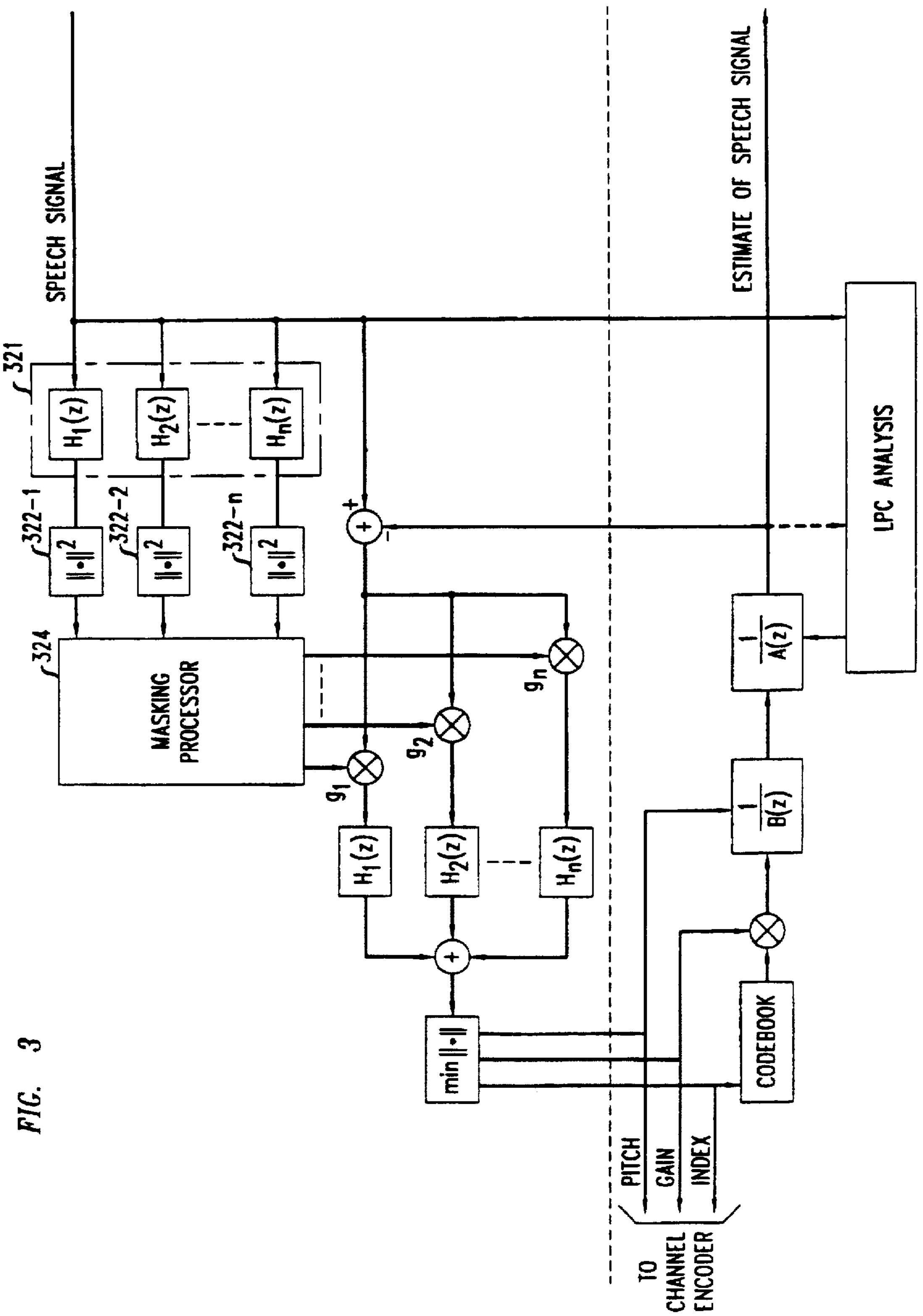
FIG. 3 is a block diagram of an analysis-by-synthesis coder and decoder which includes the inventive noise weighting filter.

FIG. 3 illustrates the inventive noise-shaping filter in a closed-loop, analysis-by-synthesis system like CELP. Note that the filterbank 321 and masking processor 324 have taken the place of the noise weighting filter W(z) in a traditional CELP system. Note also that because the noise weighting is carried out in a closed loop, no additional side information is required to be transmitted.

Figure 4:
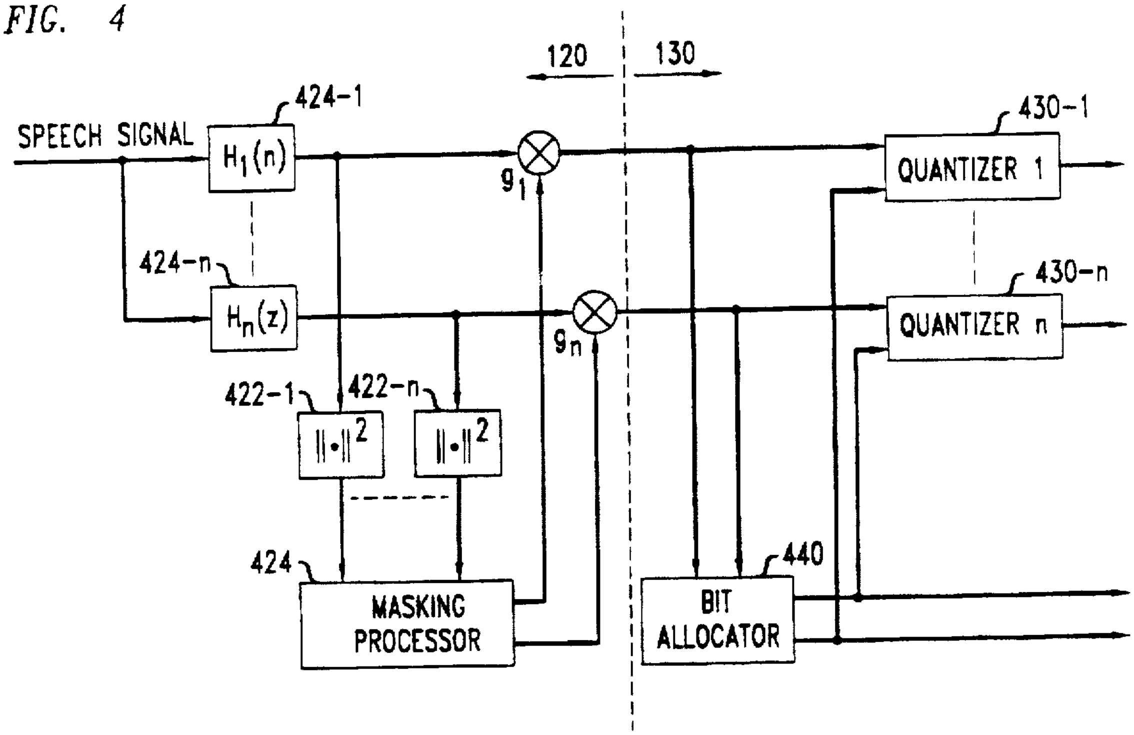
FIG. 4 is a block diagram of a subband coder and decoder with the inventive noise weighting filter used to allocate quantization bits.
Figure 5:
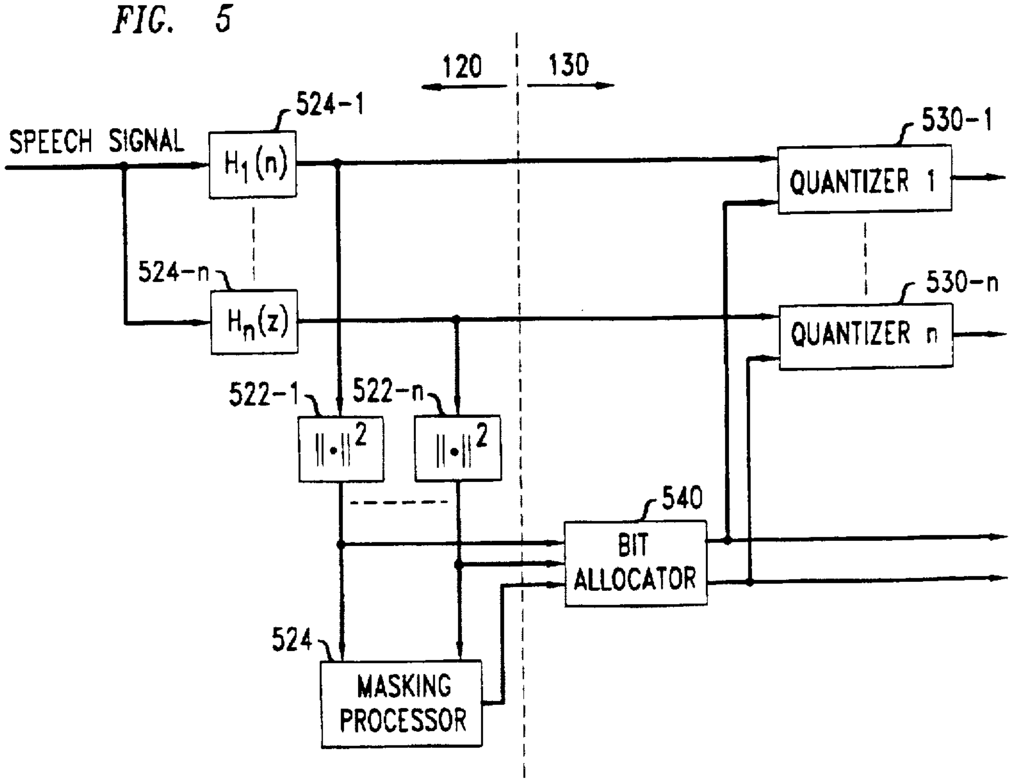
FIG. 5 is a block diagram of the inventive noise weighting filter with no gain used to allocate quantization bits.
Figure 1:
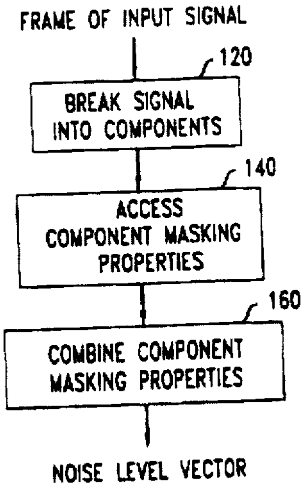
Figure 3:
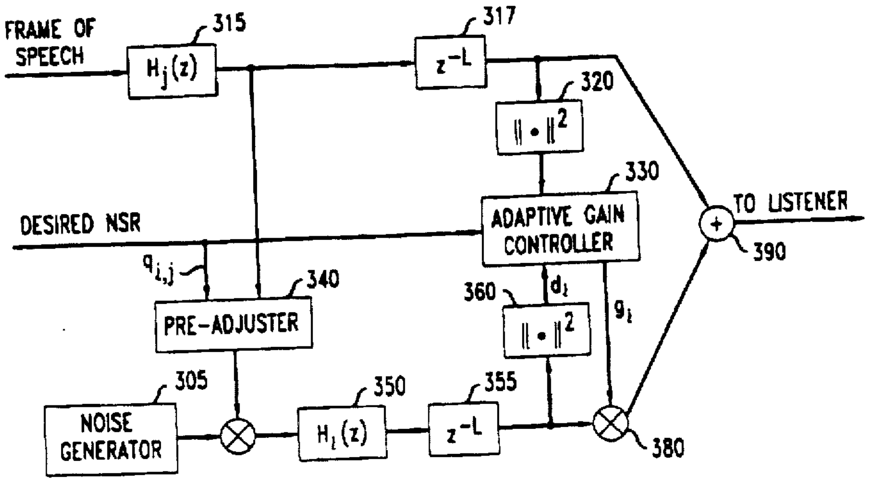

FIG. 4 shows another embodiment of the invention based on subband coding in which each subband has its own quantizer 430–i. In this configuration, noise weighting filter 120 is used to shape the spectrum of the input signal and to generate a control signal to allocate quantization bits. Bit Allocator 440 uses the weighted signals to determine how many bits each subband quantizer 430–i may use to quantize $g_i s_i$. The goal is to allocate bits such that all quantizers generate the same noise power. Let $B_i$ be the subband quantizer factor of the $i^{th}$ quantizer. The bit allocation procedure determines $B_i$ for all i such that $B_i P_{iqi}$ is a constant. This is because for all i, the weighted speech in all bands is equally important FIG. 5 is a block diagram of a noise weighting filter with no gain (i.e., all the $g_i$'s=1) used to generate a control signal to allocate quantization bits. In this embodiment the task is to allocate bits among subband quantizers 530–i such that:

$$\beta_i p_i = \alpha W_{0_i} \text{ for all } i$$

or $$\frac{\beta_i p_i}{\beta_j p_j} = \frac{W_{0_i}}{W_{0_j}}$$

Again, some record of the bit allocation will need to be sent as side information.

This disclosure describes a method an apparatus for noise weighting filtering. The method and apparatus have been described without reference to specific hardware or software. Instead, the method and apparatus have been described in such a manner that those skilled in the art can readily adapt such hardware or software as may be available or preferable. While the above teaching of the present invention has been in terms of filtering speech signals, those skilled in the art of digital signal processing will recognize the applicability of the teaching to other specific contexts, e.g., filtering music signals, audio signals or video signals.

APPENDIX

Shoham-Wierzynski 5-2

FIG. 1 illustrates a flow chart of the inventive method in which for a frame (or segment) of an input signal, a noise level vector, *i.e.* the spectrum of noise which may be added to the frame without exceeding a masking criterion, is determined *a priori*. The method involves three main steps. In step 120, the input signal frame is broken down, as for example by a filterbank, into subband components whose masking properties are known or can be determined. In step 140 the masking properties for each component are identified or accessed, *e.g.* from a database or a library, and in step 160 the masking properties are combined to determine the noise level vector, *i.e.* the spectrum of noise power that can be masked by the input signal.

Note that the method represents the frame of the input signal as a sum of subband components each of whose masking properties has already been measured. However, in order to determine the noise level vector of an input speech signal, the masking properties of the components required in step 140 must first be determined. Once the library of component masking properties is determined and advantageously stored in a database, the masking components can always be accessed, and optionally adapted, to determine the noise level vector of any input signal.

The inventive method of FIG. 1 recognizes that the masking property of a speech signal, *i.e.* the spectrum of noise that the speech signal can mask, can be based on the masking property of components of the speech. For example, in order to determine the masking properties of speech, a segment or frame of a first speech input signal is split into subband components, as for example by using a filterbank comprising a plurality of subband (bandpass) filters. In order to determine the spectrum of noise that can be masked by the first speech input signal in a first embodiment, the spectrum of noise that can be masked by each subband component of the speech input signal is determined and then the spectra for all subband components are combined to find the noise level vector for the first speech input signal.

In another embodiment, for each subband component a measurement is taken to determine how much narrowband noise in each subband can be masked. Thus, the measurement could be summarized as a method consisting of two nested steps:

1. for every subband of speech $i$ and
   a. for every subband of white noise $j$:
      i. Adjust the noise in subband $j$ to the point where sufficient noise is added so that the masking criterion is met. Measure the noise-to-signal ratio at this point.
   b. repeat for next subband $j$
2. repeat for next subband $i$.

Figures 2B, 4:
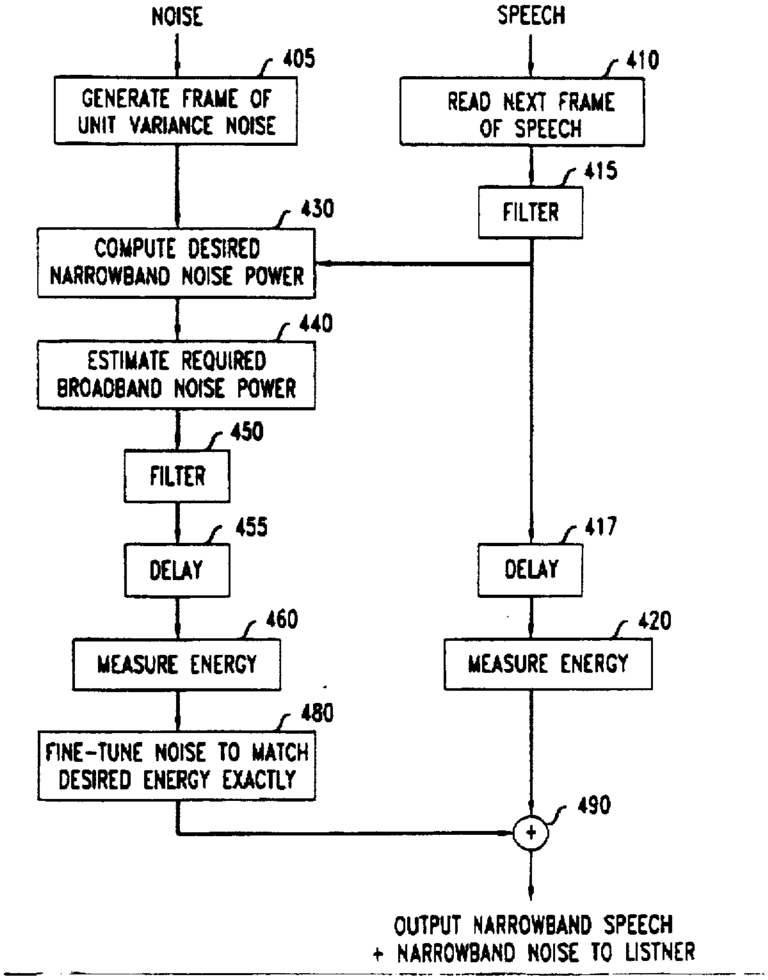

The noise-to-signal measurements for each combination of $i$ and $j$, $q_{i,j}$, represent the ratio of noise power in band $j$ that can be masked by the first speech input signal in band $i$. The elements $q_{i,j}$ form a matrix Q. An example of such a Q matrix is illustrated in FIG. 2A where, for convenience, the entries have been converted to decibels. The Q matrix of FIG. 2A illustrates the results of an experiment in which narrowband speech masked narrowband noise. The row numbers correspond to noise bands; the column numbers correspond to speech bands. Each element $q_{i,j}$ represents the maximum power ratio that can be maintained between noise in band $j$ and the first speech input signal in band $i$ so that the noise is masked. Note that not all $q_{i,j}$ have an associated value, *i.e.* some entries in the Q matrix are blank, because, as explained below, it typically is not necessary to determine every value in the Q matrix in order to determine the noise level vector. As explained below, the subbands in the Q matrix are not uniform in bandwidth. Instead, the bandwidth of each subband increases with frequency. For example, as shown in Table 2 below, subband 1 covers a frequency range of 80 Hz, from 0 to 80 Hz, while subband 20 covers a frequency range of 770 Hz, from 6230 Hz to 7000 Hz. If the power in each subband of the input frame of the first speech signal is represented as a column vector, $\mathbf{p}=[p_1,p_2,\ldots p_n]_1^T$, the noise level vector $\mathbf{d}_{NLV}$ may be found based on the Q matrix and on the p vector: $\mathbf{d}_{NLV}=\mathbf{Qp}$, *i.e.* the noise level vector is also a column vector obtained by multiplying the $n \times n$ Q matrix by the $n$ column vector of the power in each subband of the input frame of speech as shown in FIG. 2B.

In either embodiment, once either the spectrum of noise masked by each subband component or the elements in the Q matrix have been determined for a given input signal, they can be used to determine the spectrum of noise that can be masked not only by the given input signal but also by other input signals. For example, if the power in each subband of a second input signal is $\mathbf{p}_2 = [p_1, p_2, ... p_n]_2^T$, then $\mathbf{d}_{NLV_2} = \mathbf{Q}\mathbf{p}_2$ with Q as determined by the input signal.

Note that each $q_{i,j}$ is a power ratio determined for a particular masking criterion. This definition makes sense for stationary stimuli (*i.e.* signals whose statistical properties are invariant to time translation), but in the case of dynamic stimuli, such as speech, care must be taken in adding noise power to a signal whose level varies rapidly. In this instance, this problem is advantageously avoided by arranging for the noise power level to vary with the speech power level so that within a given segment or frame, the ratio of speech to noise power is a pre-determined constant. In other words, the level of the added noise is dynamically adjusted in order to achieve a constant signal-to-noise ratio (SNR) throughout the frame. Measuring the amount of masking between one subband component of speech and another subband of noise therefore consists of listening to an ensemble of frames of bandpassed speech with a range of segmental SNRs to determine which SNR value meets the masking criterion. Different frame sizes may advantageously be used for different subbands as described below.

B2 cont'd

In the paragraphs that follow a more rigorous presentation is given of the method described above. A method for determining the masking properties of the component signals required for step 140 is presented below first, and then a method of combining the component masking properties in step 160 is presented. The presentation concludes with a short discussion of other potential uses for the inventive method.

The more rigorous presentation begins by assuming that an input speech signal, $s(n)$ is divided via a bank of filters into $N$ subbands $s_1(n), ..., s_N(n)$, and that the noise maskee $d(n)$ is similarly split into subband components $d_1(n), ..., d_N(n)$. For each pair of subbands $(i,j)$, measure the maximum segmental noise-to-signal ratio (NSR) between $d_j(n)$ and $s_i(n)$ such that the combination of $d_j(n)+s_i(n)$ meets a given masking threshold, *e.g.* such that the combination of $d_j(n)+s_i(n)$ is aurally indistinguishable (*i.e.* meets the just noticeable distortion level) from $s_i(n)$ alone. Define the NSR to be the reciprocal of the traditional SNR, *i.e.*

$$NSR_{ij} \equiv \frac{1}{SNR_{ij}} \equiv q_{ij} = \frac{|\mathbf{d}_j|^2}{|\mathbf{s}_i|^2} = \frac{\sum_k d_j^2(k)}{\sum_k s_i^2(k)} .$$

where the summation limits span the current frame of speech.

To split the speech and noise into subbands a non-uniform, quasi-critical band filterbank is designed. The term quasi-critical is used in recognition that the human cochlea may be represented as a collection of bandpass filters where the bandwidth of each bandpass filter is termed a critical band. *See*, H. Fletcher, "Auditory Patterns," *Rev. Mod. Phy.*, Vol. 12, pp. 47-65, 1940. Thus, the characteristics and parameters of the filters in the filterbank may incorporate knowledge from auditory experiments as, for example, in determining the bandwidth of the filters in the filterbank. Note that it is advantageous that the filterbank used to produce the library of masking properties of components be the same as the filterbank used in step 120 of FIG. 1. However, some constraints on the filterbank may be advantageously imposed to make measurements obtained with one set of filterbank subbands more readily applicable to filterbanks with other subbands. In particular:

B2 cont'd

1. Each filter should be as rectangular as possible, although significant passband ripple can be sacrificed in the name of greater attenuation.

2. Overlap between adjacent filters should be minimized. Thus the filterbank is not completely faithful to the human ear to the extent that experimentally measured cochlear filter responses are not rectangular and tend to overlap a great deal. These conditions are imposed, however, since the ultimate interest is in the problem of coding, and splitting an input signal into (nearly) orthogonal subbands prevents coding the same information twice.

3. The composite response of the filters should have nearly flat frequency response. Although perfect reconstruction is not required, the combined output should advantageously be perceptually indistinguishable from the input. This quality of the filterbank may be verified by listening tests. To avoid audible distortions due to different group delays, linear phase filters may be used, although it should be noted that because of the asymmetry of forward and backward masking it would be preferable to use minimum phase filters. This last point is illustrated by considering the case when the speech signal consists of a single spike. The combined output of a linear-phase filterbank would consist of the same spike delayed by half of the filter length, but the combined filtered noise would be dispersed equally before and after the spike. Since forward masking extends much farther in time than backward masking, it would be preferable if more noise came after the spike instead of before; this might be achieved with a more complicated minimum-phase filter design.

In order to model the constant-Q, critical band nature of the cochlea, the following constraints may also advantageously be imposed:

4. $N = 20$ total subbands, corresponding roughly to the number of critical bands between 0 and 7KHz as found in prior experimental methods.

5. The bandwidths form an increasing geometric series.

Assume that the first band spans the frequencies $[0,a]$ and call $b$ the ratio between successive bandwidths, then these last two conditions may be summarized as $$f_{20} = a\frac{b^{20}-1}{b-1},$$

where $f_{20}$ is the highest frequency to be included, typically 7KHz in a speech case. Setting $a = 100$, corresponding to previous measurements of the first critical band, and solved for $b$ using Newton's iterative approximation. This value of $b$ is then used to generate an ideal set of band edges as shown in Table 1.

Using these ideal band edges as a starting point, filters may be designed. In one embodiment of the invention, twenty 512-point, min-max optimal filters using the well-known Remez exchange algorithm were designed. Table 2 lists the parameters for each filter. Typically, it may be necessary to adjust the band edges so that the composite filterbank response would be flatter, but the filterbank's combined output should sound identical to the input.

Since the human cochlea exhibits increasing time resolution at higher frequencies, the frame size for each band is advantageously chosen according to the length of the impulse response of the band filter. For higher bands, the energy of the impulse response becomes more concentrated in time, leading to a choice of a smaller frame size. Table 3 shows the relationship between the noise band number and frame size.

Despite the well-known dependence of masking on stimulus level, no precise restrictions on loudness during the experiments typically need be imposed. It is usually sufficient to measure masking effects under the normal operating conditions of an actual speech coder. Thus the volume control may be set to a comfortable level for listening to the full-bandwidth speech and left in the same position when listening to the constituent subbands, which as a result sound much softer than the full speech signal. Listening tests are advantageously be carried out Shoham-Wierzynski 5-2 in a soundproof booth using headphones with the same signal is presented to both ears.

As mentioned above, the level of the noise should be adjusted on a frame-by-frame basis in order to maintain a constant local NSR, $q_{ij}$. FIG. 3 is a block diagram of a system to achieve this for each frame of speech. FIG. 4 is a flowchart illustrating steps carried out by the system of FIG. 3. The operation of the system of FIG. 3 is advantageously described on a step-by-step basis:

1. Generate a frame of unit variance noise: Unit variance Gaussian random noise generator 305 is used to produce $u(n)$ in step 405, which is then scaled according to $$u(n) \leftarrow u(n) \sqrt{\frac{N}{\sum_{k=mN}^{mn+N-1} u^2(k)}} ,$$

where $N$ is the frame size and $m$ is the number of the current frame, starting from $m=0$. This ensures noise with unit variance on a frame-by-frame basis.

B2 cont'd

2. Filter speech: Input the current frame of speech in step 410. In step 415 the speech is filtered through filter $j$ 315 of the filterbank to produce $s_j(n)$.

3. Measure energy of bandpass speech: The output of filter 315 is then passed through delay 317. The delay allows the system of FIG. 3 to "look ahead" to maintain a constant local NSR as described below. To compute how much noise to inject in this frame, in step 420 calculate the energy $p_j$ of the speech as, $$p_j = \sum_{k=mN}^{mN+N-1} s_j^2(k-L) ,$$

using energy measurer 320 where $L$ s the amount of delay as explained in more detail below.

4. Measure look-ahead energy of bandpass speech: Because of the inherent delay imposed by the filterbank, adjustments to the noise level at the filter input are not immediately registered at the output. Therefore some measure of the speech power is needed in the near future to help decide how to adjust the noise level in the present. The *look-ahead* energy $\hat{p}_j$ is defined as the energy of one frame of $s_j(n)$:

Shoham-Wierzynski 5-2

$$\hat{p}_j = \sum_{k=mN}^{mN+N-1} s_j^2(k) .$$

Typically $L = 320$ samples yields the best results for 512 point filters. Note that this problem would be easier to solve if the filters were minimum-phase rather than linear phase.

5. Compute desired narrowband noise power: In step 430 multiply the speech power by the desired noise-to-signal ratio $q_{ij}$ in adaptive controller 330 to yield a desired noise power, $\Delta$:

$$\Delta = p_j q_{ij} .$$

6. Estimate required broadband noise power: To approximate the desired noise power at the filter output, it is noted that for a filter of bandwidth $\omega_i$ Hz, the filtered unit-variance noise should have a variance of $\omega_i/S$, where S is the Nyquist frequency. Linearity may therefore be exploited to try to achieve the desired noise power $\Delta$ at the filter output. Because of the filter delays described above, instead of using the speech power in the current frame to compute $\Delta$, a *look-ahead* desired noise energy $\hat{\Delta}$ is defined:

B2 cont'd $$\hat{\Delta} = \hat{p}_j q_{ij} .$$

Then the noise is scaled in pre-adjuster 340 in order to try to achieve the look-ahead energy as follows:

$$e(n) = u(n)\sqrt{\frac{S\hat{\Delta}}{\omega_i}} ,$$

7. Filter the adjusted noise: The adjusted noise $e(n)$ is filtered through band $i$ using filter 350, to yield $e_i(n)$, and then applied to delay 355 so that the noise is again synchronous with the input frame of speech.

8. Measure the energy of the bandpass noise: Next measure the actual bandpass noise power, $d_i$ in measurer 360:

$$d_i = \sum_{k=mN}^{mN+N-1} e_i^2(k-L) .$$

Shoham-Wierzynski 5-2

9. Fine-tune the noise: To adjust the noise so that the desired NSR is achieved exactly, apply at multiplier 380 a time-varying gain $g_i$ at the filter output. To minimize smearing in the noise spectrum, it is advantageous to vary $g_i$ smoothly so that it takes the form $$g_i(n-L)=\begin{cases}\frac{1}{2}B(1-\cos\frac{\pi(n-L)}{W})+A(1+\cos\frac{\pi(n-L)}{W}) & 0\le(n-L)\le W-1\\ B & W\le(n-L)\le N-1\end{cases}$$

where $A$ is the final value of $g_i$ from the previous frame, $W$ is the length of the smoothing window (which can be thought of as half of a Hann window), and $B$ is the final value of $g_i$. Thus, given $A$ and $W$, one should be able to solve for $B$ such that $$\sum_{k=mN}^{mN+N-1}[e_i(k-L)g_i(k-L)]^2=\Delta\,.$$

B2 cont'd

Because $g_i$ is linear in $B$, the above expression becomes a quadratic equation of the form $$\alpha_2 B^2+\alpha_1 B+\alpha_0=0\,,$$

where $$\alpha_2 = \frac{1}{4}\sum_{k=mN}^{mN+W-1}(1-\cos\frac{\pi(k-L)}{W})^2 e_i^2(k-L)+\sum_{k=mN+W}^{mN+N-1}e_i^2(k-L)$$

$$\alpha_1 = \frac{A}{2}\sum_{k=mN}^{mN+W-1}(1-\cos^2\frac{\pi(k-L)}{W})e_i^2(k-L)$$

$$\alpha_0 = \frac{A^2}{4}\sum_{k=mN}^{mN+W-1}(1+\cos\frac{\pi(k-L)}{W})^2 e_i^2(k-L)-\Delta\,.$$

Thus a compromise is forced between a smooth transition using a long window, and a crisp change to the desired noise level using a short window. Making the window too short smears the spectrum of the bandpass noise, an effect that typically is quite noticeable, leading to severe underestimates of masking power. Making the window too long, however, leads to more subtle clicks that emerge when the noise level lags behind the speech. Thus, an initial value of $W=N/2$ was chosen.

The quadratic equation for $B$ usually has two real solutions; typically the solution that minimized $|A - B|$ was chosen in order to avoid drastic changes in gain and reduce spectral smearing. Sometimes, however, there is no real solution. This may occur at transitions from loud to soft frames, when reducing the gain gradually had the effect of including more noise at the beginning of the frame than we wanted in the entire frame. In these cases $W$ may be decremented until the longest possible window that allowed an exact solution was found. In rare cases this search can lead to $W=0$, but only during very soft passages when both speech and noise were below the threshold of hearing. In the $W=0$ case, $g_i$ has the form $$g_i(n-L) = \sqrt{\frac{\Delta}{\sum_{k=mN}^{mN+N-1} e_i^2(k-L)}}\ .$$

Since there are 20 sub-bands, potentially 400 combinations of $i$ and $j$ need to be measured. However, it is not typically necessary to carry out the experiment for every particular $(i,j)$ combination because masking depends on how closely the signal component and masker are in frequency. Thus, typically measurements should be taken for combinations of $i$ and $j$ such that $|i-j| \leq 2$. Values for $q_{i,j}$ for $|i-j| > 2$ can typically be assumed to be zero, *i.e.* no masking takes place, with perhaps the exception of small values of $i$ and $j$ where masking may sometimes extend over 3 bands.

Recall that a noise level vector for a speech signal, *i.e.* the spectrum of noise masked by the input signal, may be calculated according to a three step process. Already demonstrated is that speech might best be analyzed in terms of its constituent critical bands, and determining the masking properties of each band. Now the third step of the process, namely, superposing the masking properties of the subbands to form a noise level vector, is discussed.

Given a vector of speech powers $\mathbf{p} = (p_1, \ldots, p_{20})$, where $p_i$ corresponds to the power of the speech in band $i$ in the current frame, a noise level vector $\mathbf{d} = (d_1, \ldots, d_{20})$ can be determined such that noise added at these levels or below does not exceed the masking threshold.

This calculation requires knowledge of how to add the masking effects of two or more maskers and the effects are combined simple addition; or, more formally:

Linear superposition of noise power: If a signal $S$ masks a noise power vector $\mathbf{d} = (d_1,\ldots,d_{20})^T$, *i.e.*, where $d_j$ is the power of the noise in band $j$ in the current frame and "T" indicates the transpose; and another signal $S'$, uncorrelated with $S$, masks a noise power vector $\mathbf{d}' = (d'_1,\ldots,d'_{20})^T$; then the combined signal $S+S'$ will mask the noise power vector $$\mathbf{d}+\mathbf{d}' = (d_1+d'_1,\ldots,d_{20}+d'_{20})^T$$

Simple addition is advantageously used instead of non-linear superpositions rules because it typically leads to more conservative estimates of the masking properties of the signal.

Note generally that the superposition idea assumes that consecutive bands in the filterbank do not overlap, so that the noise level in one band can be adjusted without affecting the level in another, and so that the speech may be decomposed into uncorrelated subbands. Thus high-order, nearly rectangular filters in the filterbank were used.

Accordingly the total spectrum of the noise level vector, $\mathbf{d}_{NLV}$ can be found in a given frame if we know the masking property $\mathbf{d}_i$ for every band of speech $i = 1,\ldots,20$ is known. This involves a simple sum of noise powers:

$$\mathbf{d}_{NLV} = \sum_{i=1}^{20} \mathbf{d}_i \, . \tag{4.2}$$

To find the masked noise vector $\mathbf{d}_i$ for speech band $i$, use the measured threshold NSRs $q_{ij}$. Since the speech power $p_i$ and the minimum ratio of speech to noise power $q_{ij}$ are known, then the maximum masked power in bands 1-20 using one column of the $q_{ij}$ matrix can be computed:

$$\mathbf{d}_i = \left[p_i q_{i1}, p_i q_{i2}, \ldots, p_i q_{i20}\right]^T \, . \tag{4.3}$$

In other words, the threshold noise power in each band is equal to the product of the signal power and the threshold noise-to-signal ratio.

Combining equations 4.2 and 4.3 to summarize the method as one matrix equation yield.

$$\mathbf{d}_{NLV} = \mathbf{Q}\mathbf{p} \, . \tag{4.4}$$

where $\mathbf{Q} = [q_{ij}]$. (Note that whenever $q_{ij}$ has not been measured, assume that there is zero masking; $q_{ij} = 0$.) Equation 4.4 thus describes how the noise level vector for a given frame of speech can be determined based on the input power in the speech frame and on the masking properties of speech as represented by the masking matrix Q.

The above method is flexible in that new knowledge about masking effects in the human auditory system may be readily incorporated. The choice of a linear superposition rule, for example, can be easily changed to a more complex function based on future auditory experiments. The values in the Q matrix, moreover, need not be fixed. Each element in the matrix could be adaptive, *e.g.* a function of loudness since masking properties have been shown to change at high volume levels. It would also be easy to use different Q matrices depending on whether the current frame of speech consisted of voiced or unvoiced speech.

Shoham-Wierzynski 5-2

| Band number | Lower edge Hz | Upper edge Hz |
|---|---|---|
| 1 | 0 | 100 |
| 2 | 100 | 212 |
| 3 | 212 | 337 |
| 4 | 337 | 476 |
| 5 | 476 | 632 |
| 6 | 632 | 806 |
| 7 | 806 | 1001 |
| 8 | 1001 | 1219 |
| 9 | 1219 | 1462 |
| 10 | 1462 | 1734 |
| 11 | 1734 | 2038 |
| 12 | 2038 | 2377 |
| 13 | 2377 | 2756 |
| 14 | 2756 | 3180 |
| 15 | 3180 | 3654 |
| 16 | 3654 | 4183 |
| 17 | 4183 | 4775 |
| 18 | 4775 | 5436 |
| 19 | 5436 | 6174 |
| 20 | 6174 | 7000 |

TABLE 1

B2 cont'd

Shoham-Wierzynski 5-2

| Band number | Lower edge Hz | Upper edge Hz | $\Delta f_{low}$ Hz | $\Delta f_{high}$ | W | Scale factor |
|---|---|---|---|---|---|---|
| 1 | 0 | 80 | 70 | 80 | 200.0 | 1.0 |
| 2 | 120 | 195 | 75 | 75 | 450.0 | 0.9 |
| 3 | 228 | 300 | 80 | 80 | 300.0 | 0.9 |
| 4 | 337 | 435 | 75 | 75 | 300.0 | 0.9 |
| 5 | 485 | 600 | 90 | 90 | 150.0 | 1.0 |
| 6 | 660 | 806 | 85 | 85 | 150.0 | 1.0 |
| 7 | 860 | 1000 | 85 | 85 | 150.0 | 1.0 |
| 8 | 1060 | 1210 | 85 | 85 | 150.0 | 1.0 |
| 9 | 1265 | 1460 | 85 | 85 | 150.0 | 1.0 |
| 10 | 1515 | 1735 | 85 | 85 | 150.0 | 1.0 |
| 11 | 1790 | 2038 | 85 | 85 | 150.0 | 1.0 |
| 12 | 2095 | 2377 | 85 | 85 | 150.0 | 1.0 |
| 13 | 2435 | 2756 | 85 | 85 | 150.0 | 1.0 |
| 14 | 2815 | 3180 | 85 | 85 | 150.0 | 1.0 |
| 15 | 3239 | 3654 | 85 | 85 | 150.0 | 1.0 |
| 16 | 3712 | 4183 | 85 | 85 | 150.0 | 1.0 |
| 17 | 4242 | 4775 | 85 | 85 | 150.0 | 1.0 |
| 18 | 4835 | 5437 | 85 | 85 | 150.0 | 1.0 |
| 19 | 5495 | 6174 | 85 | 85 | 150.0 | 1.0 |
| 20 | 6230 | 7000 | 85 | 85 | 150.0 | 1.0 |

TABLE 2

Shoham-Wierzynski 5-2

| Noise band# | Frame size (samples) |
| --- | --- |
| 1-5 | 512 |
| 6-14 | 256 |
| 15-20 | 128 |

TABLE 3

1/3

Y. SHOHAM 5-2

2/3

BJ cont'd

FIG. 2A

SPEECH (j) / noise (i)

| i \ j | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | -6 | | | | | | | | | | | | | | | | | | | |
| 2 | | -19 | -27 | | | | | | | | | | | | | | | | | |
| 3 | | -29 | -17 | -34 | | | | | | | | | | | | | | | | |
| 4 | | -33 | -26 | -24 | -39 | | | | | | | | | | | | | | | |
| 5 | | | -32 | -27 | -22 | -41 | | | | | | | | | | | | | | |
| 6 | | | | -32 | -29 | -20 | -31 | | | | | | | | | | | | | |
| 7 | | | | | -31 | -23 | -14 | -33 | | | | | | | | | | | | |
| 8 | | | | | | -28 | -21 | -14 | -33 | | | | | | | | | | | |
| 9 | | | | | | | -27 | -17 | -16 | -32 | | | | | | | | | | |
| 10 | | | | | | | | -26 | -21 | -15 | -28 | | | | | | | | | |
| 11 | | | | | | | | | -30 | -20 | -13 | -26 | | | | | | | | |
| 12 | | | | | | | | | | -32 | -21 | -11 | -25 | | | | | | | |
| 13 | | | | | | | | | | | -32 | -21 | -14 | -26 | | | | | | |
| 14 | | | | | | | | | | | | -29 | -21 | -12 | -28 | | | | | |
| 15 | | | | | | | | | | | | | -28 | -20 | -8 | | | | | |
| 16 | | | | | | | | | | | | | | -29 | -19 | -9 | | | | |
| 17 | | | | | | | | | | | | | | | | -14 | -7 | | | |
| 18 | | | | | | | | | | | | | | | | | -19 | -6 | | |
| 19 | | | | | | | | | | | | | | | | | | -17 | -7 | |
| 20 | | | | | | | | | | | | | | | | | | | -15 | -7 |

Y. SHOHAM 5-2

3/3

$$d_{NLV} = Q_p = \begin{pmatrix} q_{1,1} & q_{1,2} & \cdots & q_{1,n} \\ \vdots & \vdots & & \vdots \\ q_{n,1} & q_{n,2} & \cdots & q_{n,n} \end{pmatrix} \begin{pmatrix} p_1 \\ \vdots \\ p_n \end{pmatrix}$$

The invention claimed is:

1. A method comprising the steps of:

receiving a signal comprising side information and an encoded signal, and decoding said encoded signal based on said side information and on a masking matrix, wherein said step of decoding comprises separating the encoded signal into a set of n subband signal components, multiplying each subband signal component by a corresponding one of a set of n gain values to generate a corresponding one of a set of n multiplied subband signal components, the set of n gain values based on the masking matrix, and combining the n multiplied subband signal components to produce a decoded signal.

2. The method of claim 11 wherein said encoded signal is an encoded speech signal.

3. The method of claim 1 wherein said side information comprises a set of measurements, wherein each measurement reflects a power level of a subband component of an input signal, said input signal having been encoded to form said encoded signal.

4. The method of claim 3 wherein said masking matrix is an n×n matrix wherein each element $q_{ij}$ of said masking matrix is the ratio of a noise power in band j that can be masked to a power level of the subband component in band i.

5. The method of claim 4 wherein said subband component is an output of a filterbank comprising a set of n filters wherein the output of each filter is a respective subband signal component.

6. The method of claim 1 wherein said side information comprises said set of n gain values.

7. A system comprising:

means for receiving a signal comprising side information and an encoded signal, and means for decoding said encoded signal based on said side information and on a masking matrix, wherein said means for decoding comprises means for separating the encoded signal into a set of n subband signal components, means for multiplying each subband signal component by a corresponding one of a set of n gain values to generate a corresponding one of a set of n multiplied subband signal components, the set of n gain values based on the masking matrix, and means for combining the n multiplied subband signal components to produce a decoded signal.

8. The system of claim 7 wherein said encoded signal is an encoded speech signal.

9. The system of claim 7 wherein said masking matrix Q is an n×n matrix wherein each element $q_{ij}$ of said masking matrix is the ratio of a noise power in band j that can be masked to a power level of a subband component in band i.

10. The system of claim 7 wherein said means for separating comprises a filterbank comprising a set of n filters wherein the output of each filter is a respective subband signal component.

11. The system of claim 7 wherein said side information comprises said set of n gain values.

12. The system of claim 7 wherein said side information comprises a set of measurements, wherein each measurement reflects a power level of a subband component of an input signal, said input signal having been encoded to form said encoded signal.

* * * * *